United States Patent
Lanfant et al.

(10) Patent No.: US 12,214,540 B2
(45) Date of Patent: Feb. 4, 2025

(54) METHOD AND LINE FOR MANUFACTURING A PANEL WITH MULTIPLE ACOUSTIC ELEMENTS FOR AN ACOUSTIC ATTENUATION STRUCTURE

(71) Applicant: SAFRAN, Paris (FR)

(72) Inventors: Nicolas Pierre Lanfant, Moissy-Cramayel (FR); Hugues Laurent Alglave, Moissy-Cramayel (FR); Patrick Dunleavy, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/259,189

(22) PCT Filed: Jan. 13, 2022

(86) PCT No.: PCT/FR2022/050069
§ 371 (c)(1),
(2) Date: Jun. 23, 2023

(87) PCT Pub. No.: WO2022/157440
PCT Pub. Date: Jul. 28, 2022

(65) Prior Publication Data
US 2024/0042671 A1 Feb. 8, 2024

(30) Foreign Application Priority Data
Jan. 19, 2021 (FR) ...................... 2100483

(51) Int. Cl.
*B29C 51/22* (2006.01)
*B29C 33/72* (2006.01)
(Continued)

(52) U.S. Cl.
CPC .............. *B29C 51/22* (2013.01); *B29C 33/72* (2013.01); *B29C 35/0805* (2013.01);
(Continued)

(58) Field of Classification Search
CPC ... B29C 2043/463; B29C 51/44; B29C 59/04; B29C 33/72; G10K 11/172
See application file for complete search history.

(56) References Cited

U.S. PATENT DOCUMENTS 4,666,394 A * 5/1987 Wakamiya .............. B29C 51/04
264/549
5,131,970 A * 7/1992 Potter ................... B29C 70/345
156/264
(Continued)

FOREIGN PATENT DOCUMENTS

| FR | 3 082 987 A1 | 12/2019 |
| GB | 2 314 526 A | 1/1998 |
| JP | S60-244523 A | 12/1985 |

OTHER PUBLICATIONS

Ravise (Machine Translation of FR3082987) (Year: 2019).*
(Continued)

*Primary Examiner* — Michael A Tolin
*Assistant Examiner* — Hana C Page
(74) *Attorney, Agent, or Firm* — Pillsbury Winthrop Shaw Pittman LLP

(57) ABSTRACT

A method for continuously manufacturing a complex acoustic multi-element panel for an acoustic attenuation structure, the method including supplying a thermoplastic resin film at the entry of a stamping system including at least one pair of complementary cylinders, a heating of the thermoplastic resin film upstream of the entry of the stamping system, and a passage of the thermoplastic resin film between the at least one pair of complementary cylinders, the pair of complementary cylinders including a male cylinder with teeth radially protruding from the cylinder and a female cylinder with cavities on its radial surface, the cavities of the female cylinder being of shapes complementary to the shapes of the teeth of the male cylinder and a separation of the stamped (Continued)

film at the exit of the stamping system using a separator disposed at the exit of the stamping system between the stamped film and the female cylinder.

10 Claims, 7 Drawing Sheets

(51) Int. Cl.
| | |
|---|---|
| *B29C 35/08* | (2006.01) |
| *B29C 43/46* | (2006.01) |
| *B29C 51/04* | (2006.01) |
| *B29C 51/26* | (2006.01) |
| *B29C 51/42* | (2006.01) |
| *B29C 51/44* | (2006.01) |
| *B32B 3/28* | (2006.01) |
| *B32B 27/08* | (2006.01) |
| *G10K 11/168* | (2006.01) |
| *B29L 31/60* | (2006.01) |

(52) U.S. Cl.
CPC .............. *B29C 43/46* (2013.01); *B29C 51/04* (2013.01); *B29C 51/261* (2013.01); *B29C 51/426* (2013.01); *B29C 51/428* (2013.01); *B29C 51/44* (2013.01); *B32B 3/28* (2013.01); *B32B 27/08* (2013.01); *G10K 11/168* (2013.01); *B29C 2035/0822* (2013.01); *B29C 2043/463* (2013.01); *B29L 2031/60* (2013.01); *B32B 2307/102* (2013.01); *B32B 2307/7376* (2023.05)

(56) References Cited

U.S. PATENT DOCUMENTS

| | | | | |
|---|---|---|---|---|
| 5,399,221 | A * | 3/1995 | Casella | .................. B29C 65/18 |
| | | | | 428/118 |
| 5,912,442 | A | 6/1999 | Nye et al. | |
| 9,643,392 | B2 * | 5/2017 | Butler | ..................... B32B 27/06 |
| 2008/0088052 | A1 * | 4/2008 | Takada | ................. B29C 48/914 |
| | | | | 264/145 |
| 2011/0033640 | A1 * | 2/2011 | Yamada | .................... C08L 1/10 |
| | | | | 264/1.29 |
| 2012/0050874 | A1 * | 3/2012 | Lei | .......................... B29C 48/91 |
| | | | | 359/625 |
| 2018/0022012 | A1 * | 1/2018 | Rapparini | ............... B29C 51/22 |
| | | | | 156/242 |
| 2020/0202830 | A1 | 6/2020 | Brossard et al. | |

OTHER PUBLICATIONS

Haga (Machine Translation of JPS60244523) (Year: 1985).*
International Search Report as issued in International Patent Application No. PCT/FR2022/050069, dated Mar. 24, 2022.
Written Opinion of the International Searching Authority as issued in International Patent Application No. PCT/FR2022/050069, dated Mar. 24, 2022.

\* cited by examiner

[Fig.1]
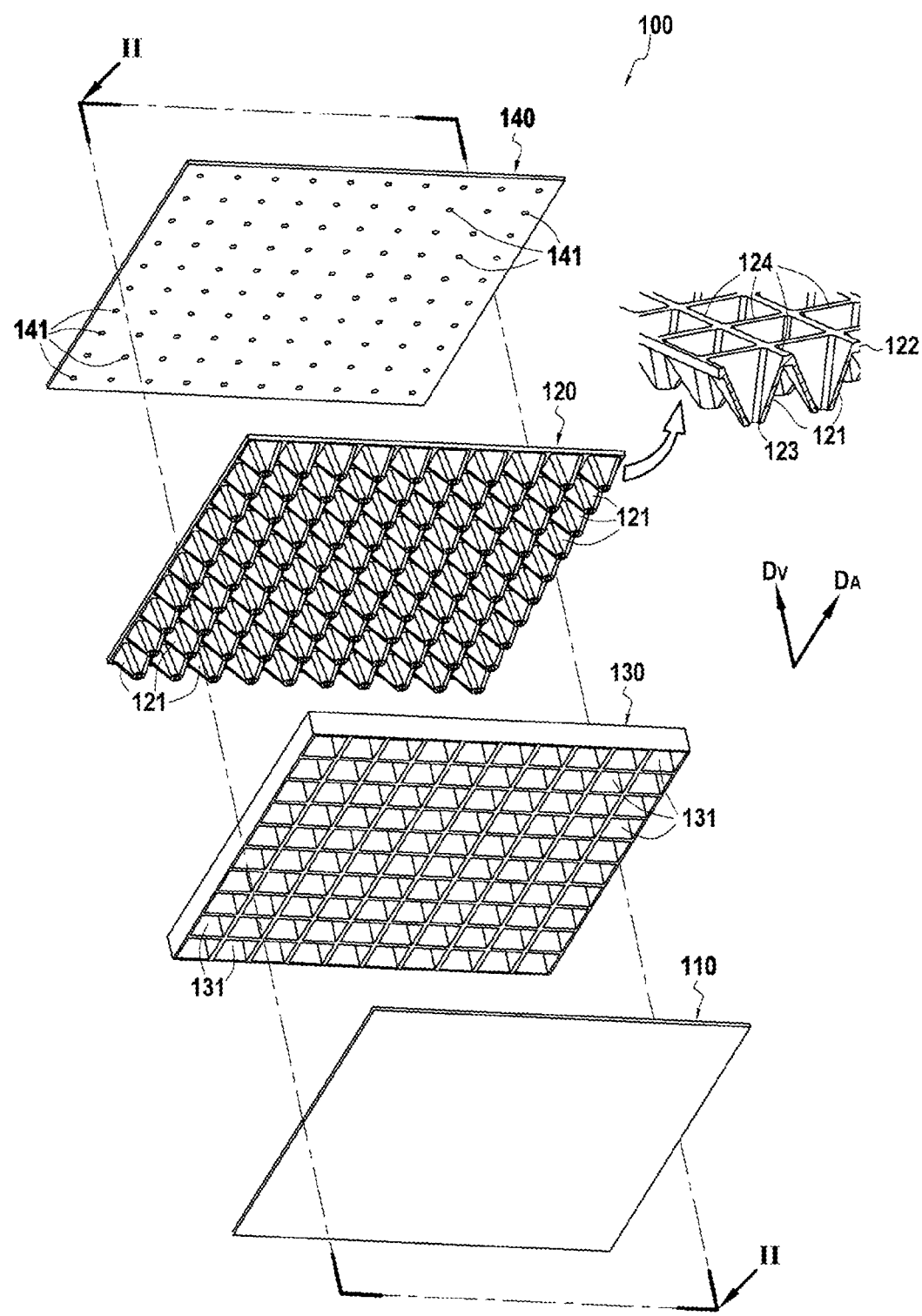

[Fig.2]
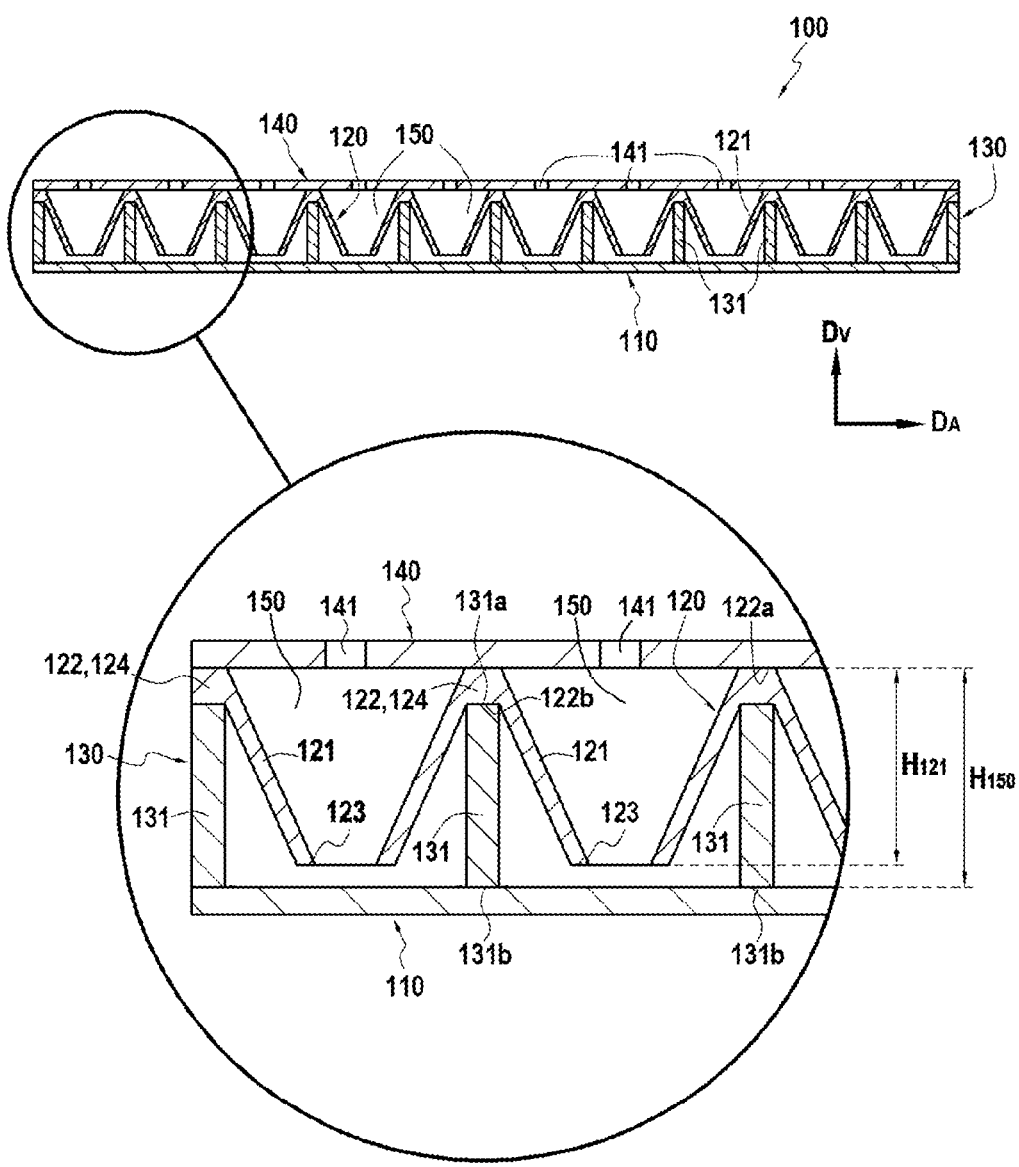

[Fig.3]
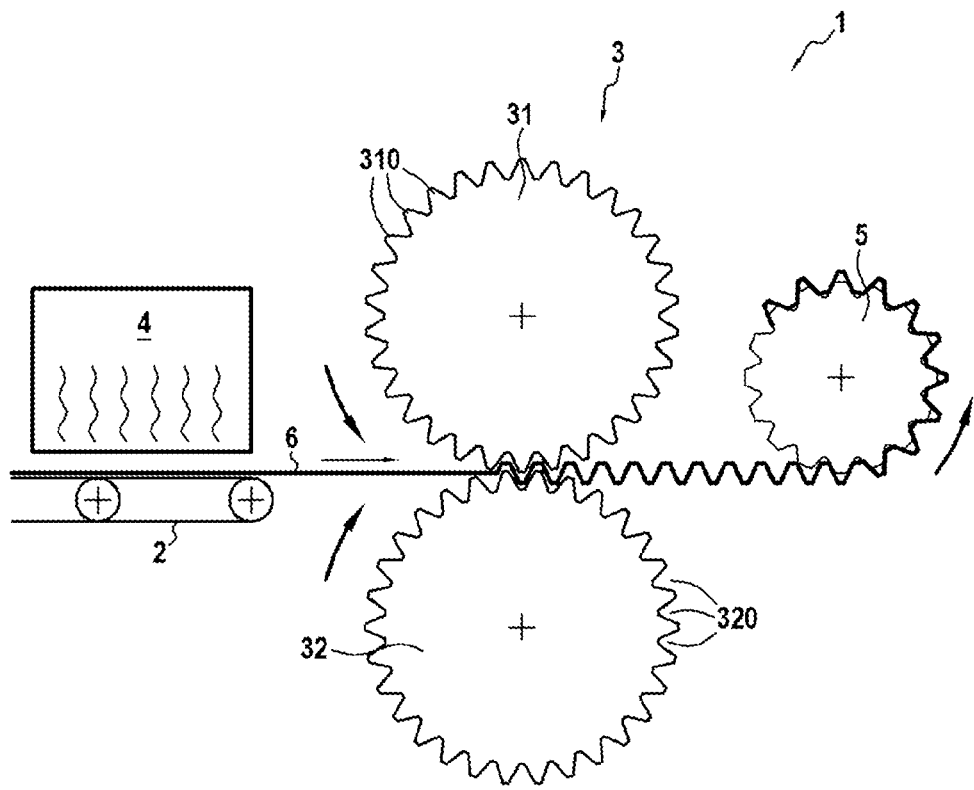
[Fig.4]
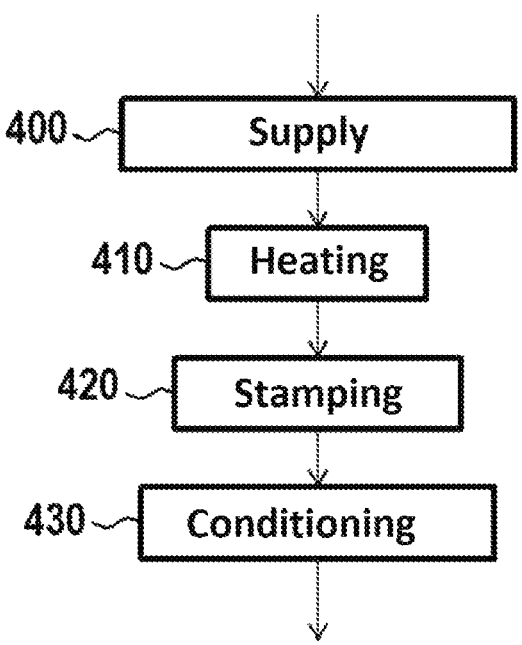

[Fig.5]
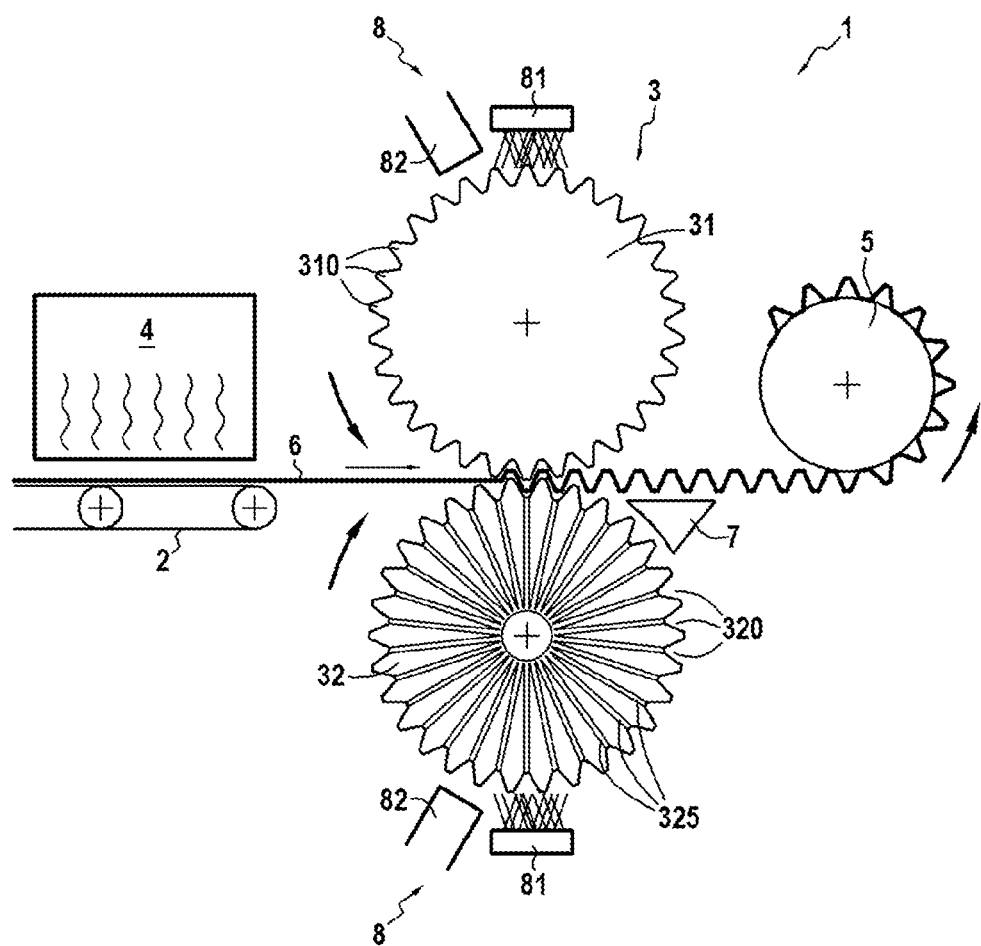

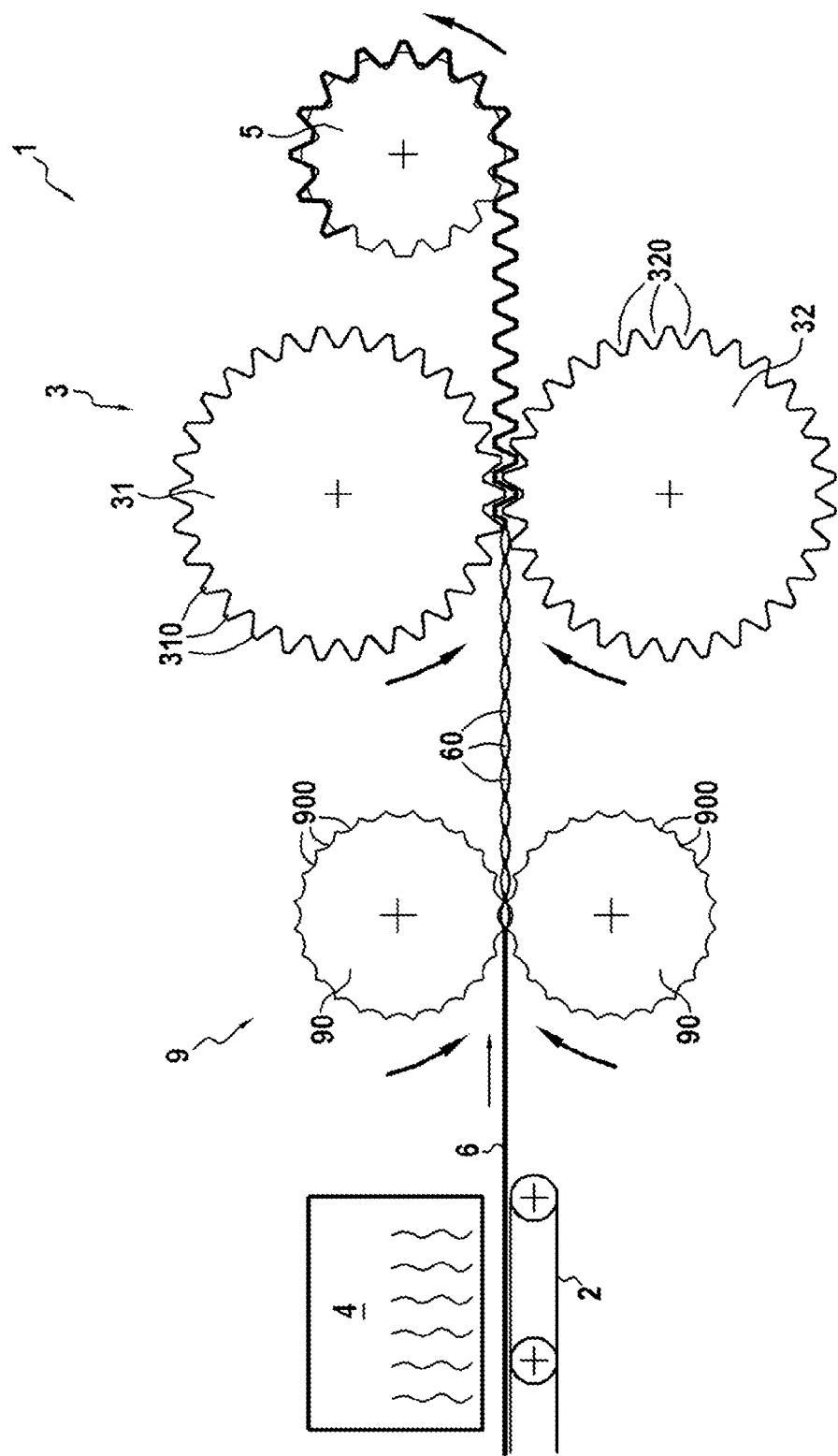

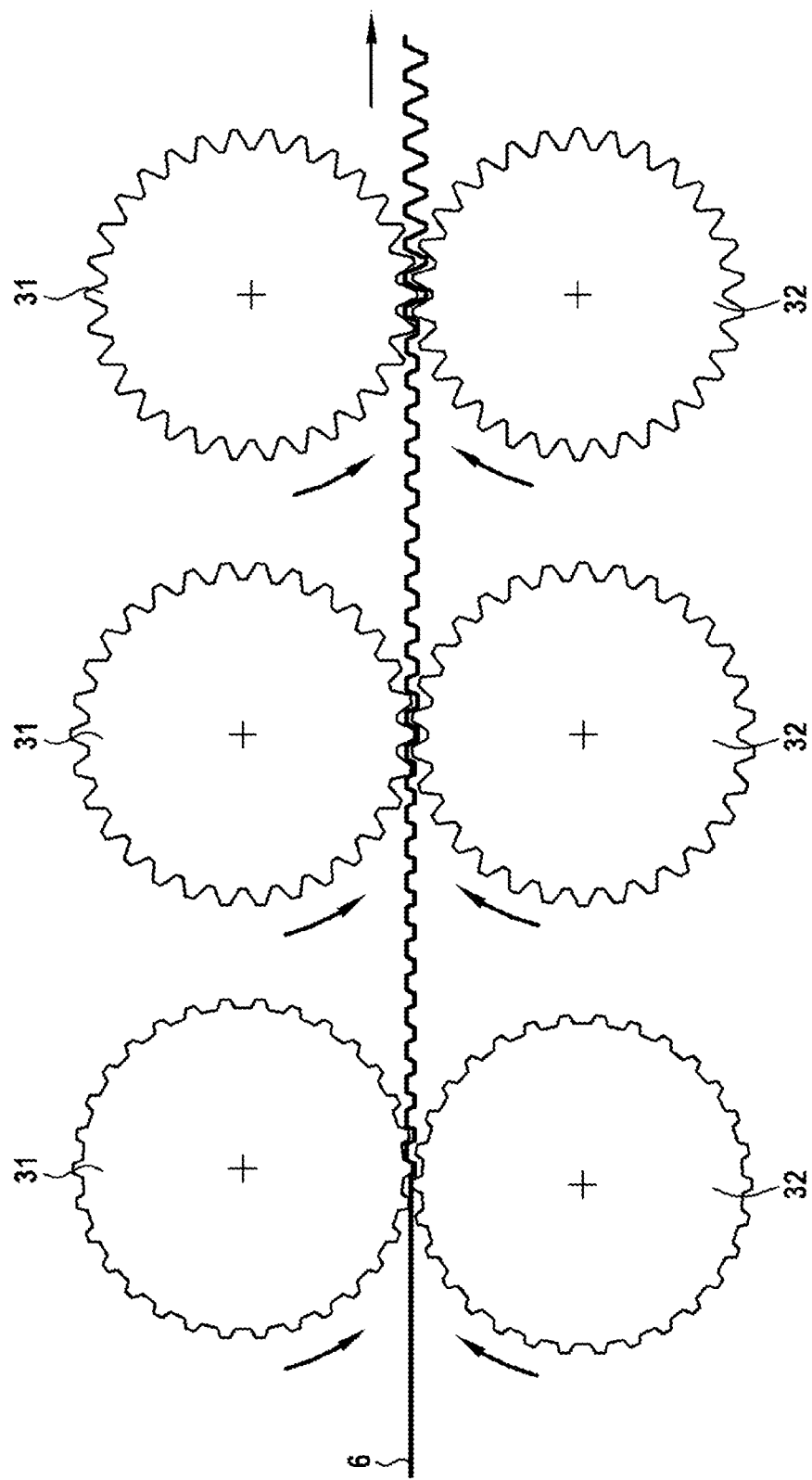

[Fig.8]
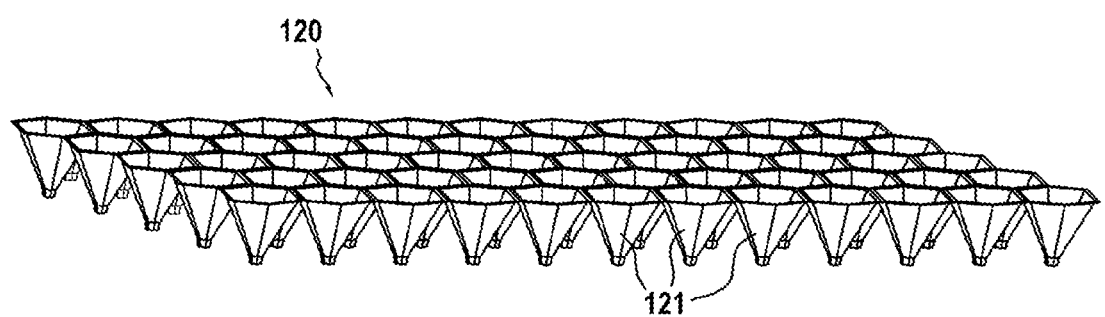

METHOD AND LINE FOR MANUFACTURING A PANEL WITH MULTIPLE ACOUSTIC ELEMENTS FOR AN ACOUSTIC ATTENUATION STRUCTURE

CROSS-REFERENCE TO RELATED APPLICATIONS

This application is the U.S. National Stage of PCT/FR2022/050069, filed Jan. 13, 2022, which in turn claims priority to French patent application number 2100483 filed Jan. 19, 2021. The content of these applications are incorporated herein by reference in their entireties.

TECHNICAL FIELD

The present invention relates to the general field of acoustic attenuation structures or panels. It relates more particularly to the manufacture of complex acoustic attenuation structures used to reduce the noise produced in aircraft engines such as in gas turbines or exhaust thereof.

PRIOR ART

The acoustic attenuation structures are typically made up of an acoustic surface plate or skin permeable to the acoustic waves desired to be attenuated, of a solid reflective plate or skin called "closure plate", and of a cell body, such as a honeycomb or a porous structure, disposed between these two walls. In a well-known manner, such panels form Helmholtz-type resonators which make it possible to attenuate the acoustic waves in a certain frequency range. Acoustic attenuation structures of this type are described in particular in documents U.S. Pat. No. 5,912,442 and GB 2 314 526.

These acoustic attenuation structures are limited to forms of simple cells such as those of the cells of a conventional structure of the NIDA® type. Consequently, the acoustic performance obtained is limited to the absorption of a frequency range that does not sufficiently cover the lowest frequencies emitted by an aircraft, in particular for aircrafts equipped with turbomachines with large diameter propellers or fans imposing a low rotational speed to meet the subsonic speed criterion at the blade tip.

A solution to increase the acoustic attenuation frequency range is to superimpose two cell bodies with different cell shapes and dimensions. This solution has the disadvantage of significantly increasing the space requirement of the acoustic attenuation structure and does not make it possible to go down in the frequency range to reduce the very low frequency waves emitted.

Another known solution consists in placing open truncated cones in cells as described in document FR 3 082 987. In document FR 3 082 987, truncated cones are interconnected by bars which must be positioned in notches made at the end of the cells. However, this solution is difficult to implement, particularly with regard to the control of the positioning between the truncated cones and the cells as well as the sealing between these elements. Indeed, if the geometry of the notches as well as that of the bars does not perfectly match, some bars are not correctly positioned in the notches, which leads to clearances with the acoustic skin. The performance and the sealing of the acoustic attenuation structure are then degraded.

DISCLOSURE OF THE INVENTION

The main purpose of the present invention is therefore to propose a manufacture of complex large-sized acoustic multi-element panels at low cost and on an industrial scale to produce acoustic attenuation structures allowing in particular the attenuation of the low frequencies in a limited space requirement.

According to one object of the invention, this purpose is achieved by means of a method for continuously manufacturing a complex acoustic multi-element panel for an acoustic attenuation structure comprising a complex acoustic multi-element panel extending following a horizontal direction and a vertical direction and comprised along the vertical direction between a porous acoustic skin and a reflective acoustic skin, said complex acoustic multi-element panel comprising a plurality of complex acoustic elements each having a shape gradually narrowing between a base and a top and a plurality of partitions surrounding each complex acoustic element so as to form a plurality of acoustic cells, said partitions extending following the vertical direction from the base of the complex acoustic elements.

According to a general characteristic of the invention, the manufacturing method comprises:
- a supply of a thermoplastic resin film at the entry of a stamping system comprising at least one pair of complementary cylinders,
- a heating of said thermoplastic resin film upstream of the entry of the stamping system,
- a passage of said thermoplastic resin film between said at least one pair of complementary cylinders, said pair of complementary cylinders comprising a male cylinder with teeth radially protruding from the cylinder and a female cylinder with cavities on its radial surface, the cavities of the female cylinder being of shapes complementary to the shapes of the teeth of the male cylinder.

The supply can be carried out using a conveyor system to avoid its bending, and the heating upstream of the stamping system makes it possible to reach on the useful area of the film, the melting temperature of the thermoplastic resin just before the stamping of the film.

According to a first aspect of the manufacturing method, the method can further comprise a conditioning of the stamped thermoplastic resin film produced at the exit of the stamping system.

The assembly can be done either in the continuity of the manufacturing line of the complex acoustic multi-element panels, instead of the conditioning roll, or separately.

According to a second aspect of the manufacturing method, the supply can be carried out continuously using a roll of a thermoplastic resin film with a thickness comprised between 0.1 and 1.5 mm, and preferably 0.1 to 0.8 mm.

The continuous supply makes it possible to produce multi-element panels of the desired length by cutting them at the exit or later.

The thickness of the order of a tenth of a millimeter makes it possible to have sufficient thickness to deform the film by stamping to create the acoustic elements.

According to a third aspect of the manufacturing method, the supply of the thermoplastic resin film at the entry of the stamping system can comprise a pushing of the thermoplastic resin film by a film supply system and a pulling of the thermoplastic resin film by the stamping system, said pushing and said pulling being simultaneous to limit the risks of undesired stretching of the film and the risks of tearing.

The pushing of the resin film can be made by conveying or gripping the edges of the film by a gripping means, the edges possibly being reinforced.

According to a fourth aspect of the manufacturing method, the heating of the thermoplastic resin film can comprise a heating by thermal conduction and/or a heating by infrared oven.

According to a fifth aspect of the manufacturing method, the heating of the thermoplastic resin film can be applied on both faces of the thermoplastic resin film, to homogenize the temperature of the film and to heat the film more quickly.

According to a sixth aspect of the manufacturing method, the heating can comprise a first heating of the thermoplastic resin film up to a first temperature threshold below the melting threshold of the thermoplastic resin, and a second heating of the thermoplastic resin film up to a temperature threshold above the melting threshold of the thermoplastic resin, the first heating being carried out before the second heating and the second heating being carried out just before the introduction of the thermoplastic resin film into the stamping.

This decomposition of the heating into two heating phases makes it possible to minimize the risks of tearing, the time during which the same area of the thermoplastic resin film has a temperature above its melting temperature being reduced to the minimum.

According to a seventh aspect of the manufacturing method, the method can further comprise, after passage in the stamping system, a separation of the stamped film at the exit of the stamping system using a separator disposed at the exit of the stamping system between the stamped film and the female cylinder to promote the unmolding.

According to an eighth aspect of the manufacturing method, the method can further comprise, after passage in the stamping system, an emission of air jets from channels disposed in the bottom of the cavities of the female cylinder of the stamping system to help the unmolding the stamped film.

According to a ninth aspect of the manufacturing method, the method can further comprise a cleaning of the teeth of the male cylinders and of the cavities of the female cylinders of the stamping system using a cleaning system mounted on each of the cylinders and configured to remove any residue on the teeth or the cavities before they are put into contact with the film.

According to a tenth aspect of the manufacturing method, the method can further comprise a control of the temperature of the cylinders of the stamping system at a temperature lower than the crystallization temperature or at the glass transition temperature of the thermoplastic resin.

According to an eleventh aspect of the manufacturing method, the method can further comprise, upstream of the passage in the stamping system, a passage of the thermoplastic resin film in a preparation system comprising two identical press cylinders with cavities facing each other during the operation of the preparation system and making it possible to compress the film on each place of the press cylinders free of cavities and to move material at the level of the areas of the film located facing the cavities of the press cylinders.

The use of a preparation system makes it possible to create an extra thickness in the area where the material will be caused to be stretched during the stamping to counteract this effect and maintain the entire fold at a constant thickness.

In another object of the invention, there is proposed a line for continuously manufacturing a complex acoustic multi-element panel for an acoustic attenuation structure comprising a complex acoustic multi-element panel extending following a horizontal direction and a vertical direction and comprised along the vertical direction between a porous acoustic skin and a reflective acoustic skin, said complex acoustic multi-element panel comprising a plurality of complex acoustic elements each with a gradually narrowing shape between a base and a top and a plurality of partitions surrounding each complex acoustic element so as to form a plurality of acoustic cells, said partitions extending following the vertical direction from the base of the complex acoustic elements.

According to a general characteristic of the invention, the manufacturing line comprises a stamping system comprising at least one pair of complementary cylinders, said pair of complementary cylinders comprising a male cylinder with teeth radially protruding from the cylinder and a female cylinder having cavities on its radial surface, the cavities of the female cylinder being of shapes complementary to the shapes of the teeth of the male cylinder, a means for supplying a thermoplastic resin film at the entry of said stamping system, a means for heating said thermoplastic resin film upstream of the entry of the stamping system.

The manufacturing line can further comprise a means for conditioning the stamped thermoplastic resin film produced at the exit of the stamping system.

According to a first aspect of the manufacturing line, the supply means can comprise a roll of thermoplastic resin film with a thickness comprised between 0.1 and 1.5 mm, preferably between 0.1 and 0.8 mm and even more preferably between 0.3 and 0.6 mm.

According to a second aspect of the manufacturing line, the means for supplying the thermoplastic resin film at the entry of the stamping system can comprise a supply system configured to apply a pushing of the thermoplastic resin film synchronized with a pulling of the thermoplastic resin film applied by the stamping system.

According to a third aspect of the manufacturing line, the means for heating the thermoplastic resin film can comprise a thermal conduction heating means and/or an infrared oven.

According to a fourth aspect of the manufacturing line, the means for heating the thermoplastic resin film can be configured to heat both faces of the thermoplastic resin film at a time.

According to a fifth aspect of the manufacturing line, the heating means may comprise a first module for heating the thermoplastic resin film up to a first temperature threshold below the melting threshold of the thermoplastic resin, and a second module for heating the thermoplastic resin film up to a temperature threshold above the melting threshold of the thermoplastic resin, the first heating module being disposed upstream of the second heating module with respect to the direction of displacement of the film.

According to a sixth aspect of the manufacturing line, the manufacturing line can comprise a separator disposed at the exit of the stamping system between the stamped film and the female cylinder.

According to a seventh aspect of the manufacturing line, the female cylinder of the stamping system can comprise channels disposed in the bottom of its cavities from which air jets are emitted to help the unmolding of the stamped film.

According to an eighth aspect of the manufacturing line, the stamping system can comprise a cleaning system mounted on each of the cylinders of the stamping system and configured to remove any residue on the teeth or the cavities before they are put into contact with the film.

According to a ninth aspect of the manufacturing line, the manufacturing line can comprise a device for controlling the temperature of the cylinders of the stamping system at a temperature below the crystallization temperature or at the glass transition temperature of the thermoplastic resin.

According to a tenth aspect of the manufacturing line, the material of the thermoplastic resin film can be chosen from polyaryletherketones (PAEK), polysulfones (PSU), polyphenylene sulphides (PPS), polyetherimides (PEI), polycarbonates (PC) and polyamides (PA).

According to an eleventh aspect of the manufacturing line, the thermoplastic resin of said film can comprise fibers on at least part of its section, the fibers being made of glass, carbon or aramid.

According to a twelfth aspect of the manufacturing line, the complex acoustic elements of the panel can have a pyramidal, conical or spinal shape.

According to a thirteenth aspect of the manufacturing line, the manufacturing line can further comprise, upstream of the stamping system, a preparation system comprising two identical press cylinders with cavities facing each other during the operation of the preparation system and making it possible to compress the film on each place of the press cylinders free of cavities and to move material at the level of the areas of the film located facing the cavities of the press cylinders.

According to another aspect of the manufacturing line, the teeth of the male cylinder of said pair of complementary cylinders can each comprise a tip configured to pierce the thermoplastic resin film.

Said acoustic attenuation structures formed from the acoustic multi-element panels preferably comprise a complex acoustic multi-element panel extending following a horizontal direction and a vertical direction and comprised between at least one acoustically reflective skin and at least one acoustically porous skin, said complex acoustic multi-element panel comprising a plurality of complex acoustic elements each having a gradually narrowing shape between a base and a top and a plurality of partitions surrounding each complex acoustic element so as to form a plurality of acoustic cells, said partitions extending following the vertical direction from the base of the complex acoustic elements, characterized in that the base of each complex acoustic element is in continuous contact with the base of the adjacent complex acoustic elements so as to form a continuous network of edges and in that one end of the partitions is in contact with the edges of the continuous network of edges.

The assembly of the acoustic attenuation structures comprises in particular an assembly of the partitions to the complex acoustic multi-element panel(s) by gluing or welding.

Thanks to the presence of complex acoustic elements surrounded by partitions, the projected height of the cells is increased. The acoustic attenuation structure of the invention is thus able to attenuate sound waves at lower frequency while having a reduced space requirement. Furthermore, the holding in position of the complex acoustic elements in the cells formed by the partitions is perfectly ensured because the bases of the acoustic cells form a continuous network of edges in contact with the ends of the partitions, which prevents any risk of appearance of clearance particularly following the vertical direction. The sealing between the complex acoustic elements, the partitions and the acoustic skin is also thus perfectly controlled.

The complex acoustic elements have a pyramidal, conical or spinal shape.

At least the complex acoustic multi-element panel is made of filled or unfilled thermoplastic or thermosetting material. This makes it possible to control the overall mass of the structure because the complex acoustic elements can be formed by injection and have very thin thicknesses.

The height of the complex acoustic elements is comprised between 10% and 99% of the height of the acoustic cells following the vertical direction.

BRIEF DESCRIPTION OF THE DRAWINGS

FIG. 1 is a schematic exploded perspective view of an acoustic attenuation structure according to one embodiment of the invention.

FIG. 2 is a schematic sectional view of the acoustic attenuation structure of FIG. 1 once assembled.

FIG. 3 is a schematic representation of a manufacturing line according to a first embodiment of the invention.

FIG. 4 shows a flowchart of a method for manufacturing an acoustic multi-element panel according to one mode of implementation of the invention.

FIG. 5 is a schematic representation of a manufacturing line according to a second embodiment of the invention.

FIG. 6 is a schematic representation of a manufacturing line according to a third embodiment of the invention.

FIG. 7 is a partial schematic representation of a manufacturing line according to a fourth embodiment of the invention.

FIG. 8 shows a complex acoustic multi-element panel according to a second embodiment.

DESCRIPTION OF THE EMBODIMENTS

FIGS. 1 and 2 represent an acoustic attenuation structure 100 in accordance with one embodiment of the invention. The acoustic attenuation structure 100 here comprises a closure skin or plate 110, a complex acoustic multi-element panel 120, a plurality of partitions 131 and an acoustic skin or plate 140.

The closure skin 110 corresponds to a solid surface intended to reflect the sound waves entering the acoustic attenuation structure. The closure skin can be a constituent element of the acoustic attenuation structure as in the example described here or correspond to a structure of an object, for example an aircraft engine. In the latter case, the acoustic attenuation structure of the invention does not include a closure skin and is directly mounted on the structure of the object.

The acoustic skin 140 has the function of allowing the sound waves to be attenuated to pass inside the acoustic attenuation structure 100. For this purpose and in the example described here, the acoustic skin 140 comprises a plurality of perforations 141.

The complex acoustic multi-element panel 120 is formed in a single piece and extends in length and in width following a horizontal direction $D_H$ and in height following a vertical direction $D_V$. The complex acoustic multi-element panel comprises a plurality of complex acoustic elements 121 each having a gradually narrowing shape between a base 122 and a top 123. In the example described here, the complex acoustic elements 121 have a pyramidal shape. The base 122 of each complex acoustic element 121 is in continuous contact with the base of the adjacent complex acoustic elements so as to form a continuous network of edges 124.

In the example illustrated in FIG. 4, the acoustic elements 121 of the complex acoustic multi-element panel 120 are of pyramidal shape with a square base. In variants of embodiment, they can be pyramidal with a polygonal base or conical with a circular base.

FIG. 8 illustrates an exemplary embodiment of a complex acoustic multi-element panel 120 provided with acoustic elements 120 of pyramidal shape with a hexagonal base. The hexagonal base of the pyramids formed by the acoustic elements 121 of the panel 120 make it possible to have acoustic elements 121 distributed according to a staggered network on the panel 120, while in FIG. 1 the acoustic elements 121 with a square base are distributed according to an orthonormal network.

In the exemplary embodiment described here, the plurality of partitions 131 is made in a single piece, namely a network of ribs 130 which, once assembled with the complex acoustic multi-element panel 120, forms the partitions around the complex acoustic elements 121.

Still in the example described here, the acoustic attenuation structure 100 is produced by assembling the complex acoustic multi-element panel 120 with the plurality of partitions 131 in a single piece, the upper edge 131a of the partitions 131 being fixed, for example by gluing or welding, on the lower portion 122b of the bases 122 of the complex acoustic elements 121 (FIG. 2). The plurality of complex acoustic elements being formed in a single piece within the complex acoustic multi-element panel and the plurality of partitions also being formed in a single piece, the assembly between these two elements is greatly facilitated by the self-positioning of the complex acoustic elements with the partitions.

The acoustic skin 140 is fixed, for example by gluing or welding, on the lower edge 131b of the partitions 131 while the closure skin 110 is fixed, by gluing or welding, on the upper portion 122a of the bases 122 of the complex acoustic elements 121 corresponding to the exposed surface of the edges 124. Thus, the acoustic skin and the closure skin are each fixed to a perfectly planar support following the horizontal direction $D_H$, which makes it possible to ensure a very good sealing between the skins and the assembly of the complex acoustic multi-element panel with the plurality of partitions.

Once assembled, the attenuation structure 100 comprises a plurality of acoustic cells 150 each formed by a complex acoustic element 121 and the partitions 131 which surround it (FIG. 2). The height $H_{121}$ of the acoustic cells 121 is smaller than the height $H_{150}$ of the acoustic cells 150. More specifically, the height $H_{121}$ of the acoustic cells is comprised between 10% and 99% of the height $H_{150}$ of the acoustic cells following the vertical direction.

FIG. 3 schematically represents a manufacturing line for producing the complex acoustic multi-element panel 120 of the acoustic attenuation structure 100 of FIGS. 1 and 2 according to a first embodiment.

The line 1 for manufacturing an acoustic multi-element panel 120 comprises a conveyor belt 2, a stamping system 3, a heating device 4 and a conditioning roll 5.

The stamping system 3 comprises a male cylinder 31 having teeth 310 extending radially from the cylinder and a female cylinder 32 having cavities 320 on its radial surface, the cavities 320 of the female cylinder 32 being of shapes complementary to the shapes of the teeth 310 of the male cylinder 31.

The conveyor belt 2 transports a thermoplastic resin film 6 up to the entry of the stamping system 3. The conveyor belt thus pushes the film 6 until it is caught between the male cylinder 31 and the female cylinder 32 of the stamping system 3 which applies a pulling force on the film 6 synchronized with the pushing of the conveyor belt 2.

The thermoplastic resin film 6 is made from a material chosen from polyaryletherketones (PAEK), polysulfones (PSU), polyphenylene sulphides (PPS), polyetherimides (PEI), polycarbonates (PC) and polyamides (PA). The film 6 has a thickness comprised between 0.1 and 1.5 mm, and can come from a roll of resin film whose unwinding results from the movement of the conveyor belt 2 or is synchronized with the conveyor belt 2.

The heating device 4 is disposed upstream of the stamping system 3. It is configured to cooperate with the conveyor belt 2. It thus comprises a first heating module placed in the conveyor belt 2 to heat a first face of the film 6 laid on the conveyor belt 2 and a second heating mode disposed facing the conveyor belt 2 to heat a second face of the film 6 opposite to the first face. The first heating module is a thermal conduction module making it possible to heat the conveyor belt 2. The second heating module is an infrared oven. The two heating modules are configured to heat the film 6 so that it is at a temperature above a temperature threshold above the melting threshold of the thermoplastic resin of the film 6 when the film 6 leaves the treatment area of the heating device 4, that is to say just before it enters the stamping system 3.

The male and female cylinders 31 and 32 of the stamping system 3 are driven by a unit for controlling the temperature of the cylinders 31 and 32 of the stamping system 3 making it possible to maintain the male and female cylinders 31 and 32 at a temperature below the crystallization temperature or at the glass transition temperature of the thermoplastic resin of the film 6.

The conditioning roll 5 makes it possible to recover the formed acoustic multi-element panel and to condition it without cutting it so as to be able to cut any panel length desired.

FIG. 4 presents a flowchart of a method for manufacturing a multi-element panel 120 from a film 6 and the manufacturing line 1 of FIG. 3.

In a first step 400 of the manufacturing method, the resin film 6 is supplied by the conveyor belt 2 up to the entry of the stamping system 3.

In a second step 410, during its transport by the conveyor belt 2, the film 6 is heated by the heating device 4 up to a temperature above the melting point of the thermoplastic resin of the film 6.

The heating can be broken down into at least two heating sequences, in particular via at least two first heating modules and two second heating modules. During the first heating sequence, the film is heated to a temperature slightly lower than the melting temperature of the thermoplastic resin, and during the second heating sequence, or the last sequence in the case where there are more than two heating sequences, the film is finally brought to a temperature above the melting point of the thermoplastic resin of the film 6.

In a third step 420, the film 6 thus heated is introduced into the stamping system 3. The heated film 6 is stamped between the teeth 310 of the male cylinder 31 and the cavities 320 of the female cylinder 32, each tooth 310 entering a cavity 320 by pushing with it material from the film 6 to form an acoustic shape. The rotational speed of the male and female cylinders 31 and 32 is identical and the number of teeth 310 of the male cylinder 31 corresponds to the number of cavities 320 of the female cylinder 32.

In a fourth step 430, the stamped film 6 is unmolded and taken out of the stamping system to be conditioned on the conditioning roll 5. During conditioning, a fresh air intake system can be set up between the stamping system 3 and the conditioning roll 5 to lower the temperature of the product before winding.

FIG. 5 schematically represents a manufacturing line for producing the complex acoustic multi-element panel 120 of the acoustic attenuation structure 100 of FIGS. 1 and 2 according to a second embodiment.

The second embodiment illustrated in FIG. 5 differs from the first embodiment illustrated in FIG. 3 in that the stamping system 3 comprises several additional elements.

The stamping system 3 in particular comprises a separator 7 disposed at the exit between the stamped film and the female cylinder 32. The separator makes it possible to ensure the unmolding of the film from the interior of the cavities 320.

Furthermore, the female cylinder 32 of the stamping system 3 comprises channels 325 disposed in the bottom of its cavities 320 and supplied by an air stream. The channels 325 thus make it possible to deliver air jets from the bottom of the cavities 320 and thus to help the unmolding of the stamped film.

The stamping system 3 also comprises a cleaning system 8 mounted on each of the male and female cylinders 31 and 32 and configured to remove any residue on the teeth 310 and the cavities 320 before they are put back into contact with the film. 6. The cleaning system 8 comprises for each cylinder a brushing device and a suction device making it possible to recover the elements thus detached.

Furthermore, in this embodiment, the conditioning roll 5 is a non-toothed cylinder.

FIG. 6 schematically shows a manufacturing line for producing the complex acoustic multi-element panel 120 of the acoustic attenuation structure 100 of FIGS. 1 and 2 according to a third embodiment.

The third embodiment illustrated in FIG. 6 differs from the first embodiment illustrated in FIG. 3 in that the manufacturing line 1 further comprises, upstream of the stamping system 3, a preparation system 9 comprising two identical press cylinders 90 with cavities 900 facing each other during the operation of the preparation system 9 and compressing the film 6 on each place of the press cylinders free of cavities 900 and displacing the material resulting from the compression at the level of the areas of the film 6 located facing the cavities 900 of the press cylinders 9.

A film with nipples 60 is thus obtained at the exit of the preparation system 9, the thickness of the film 6 between the nipples 60 being thinner than the thickness of the film 6 at the entry of the preparation system 9.

The manufacturing line 1 is configured so that each nipple is in the stamping system 3 between a tooth 310 of the male cylinder 31 and a cavity of the female cylinder 32. The extra thickness of material at the level of each nipple will be stretched during the stamping. This extra thickness before the stamping thus makes it possible to reduce or even eliminate the risks of tearing of the film during its deformation by stamping, and also to obtain an acoustic multi-element panel with a uniform thickness whether for the thickness of the film between the acoustic structures created by the stamping or for the thickness of the walls of the acoustic structures.

FIG. 7 schematically represents a manufacturing line for producing the complex acoustic multi-element panel 120 of the acoustic attenuation structure 100 of FIGS. 1 and 2 according to a fourth embodiment.

The fourth embodiment illustrated in FIG. 7 differs from the first embodiment illustrated in FIG. 3 in that the stamping system 3 comprises several pairs of cylinders. In FIG. 7, the stamping system 3 comprises three pairs of cylinders, that is to say three male cylinders 31 coupled to three female cylinders 32, to achieve progressive stamping.

Depending on the direction of conveyance of the film 6, the male cylinders 31 comprise increasingly larger teeth 310 and the female cylinders 32 comprise increasingly deeper cavities 320.

The method and the manufacturing line are not limited to the illustrated embodiments and can comprise all possible combinations. In particular, in addition to the pyramids with a described square or hexagonal base, the invention can also apply in the case pyramids with a polygonal base with n sides or a cone with a circular base.

The line for manufacturing acoustic multi-element panels and the associated method thus allow a manufacture of complex large-sized acoustic multi-element panels at low cost and on an industrial scale to produce acoustic attenuation structures allowing in particular the attenuation of the low frequencies in a limited space requirement.

The invention claimed is:

1. A method for continuously manufacturing a complex acoustic multi-element panel for an acoustic attenuation structure comprising a complex acoustic multi-element panel extending following a horizontal direction and a vertical direction and comprised along the vertical direction between a porous acoustic skin and a reflective acoustic skin, said complex acoustic multi-element panel comprising a plurality of complex acoustic elements each having a shape gradually narrowing between a base and a top and a plurality of partitions surrounding each complex acoustic element so as to form a plurality of acoustic cells, said partitions extending following the vertical direction from the base of the complex acoustic elements,
wherein the manufacturing method comprises:
supplying a thermoplastic resin film at the entry of a stamping system comprising at least one pair of complementary cylinders,
heating said thermoplastic resin film upstream of the entry of the stamping system,
performing a passage of said thermoplastic resin film between said at least one pair of complementary cylinders, said pair of complementary cylinders comprising a male cylinder with teeth radially protruding from the male cylinder and a female cylinder with cavities on its radial surface, the cavities of the female cylinder being of shapes complementary to the shapes of the teeth of the male cylinder,
separating the stamped film at the exit of the stamping system using a separator disposed at the exit of the stamping system between the stamped film and the female cylinder, and conditioning the stamped thermoplastic resin film produced at the exit of the stamping system, wherein the conditioning comprises cooling the stamped film using a fresh air intake system located between the stamping system and a conditioning roll, and
forming the complex acoustic multi-element panel.

2. The method according to claim 1, wherein the supplying is carried out continuously using a roll of said thermoplastic resin film with a thickness comprised between 0.1 and 1.5 mm.

3. The method according to claim 1, wherein the supplying of the thermoplastic resin film at the entry of the stamping system comprises a pushing of the thermoplastic resin film by a film supply system and a pulling of the thermoplastic resin film by the stamping system, said pushing and said pulling being simultaneous to limit the risks of undesired stretching of the film.

4. The method according to claim 1, wherein the heating of the thermoplastic resin film comprises a heating by thermal conduction and/or a heating by infrared oven.

5. The method according to claim 1, wherein the heating of the thermoplastic resin film is applied on both faces of the thermoplastic resin film.

6. The method according to claim 1, wherein the heating comprises a first heating of the thermoplastic resin film up to a first temperature threshold below the melting threshold of the thermoplastic resin, and a second heating of the thermoplastic resin film up to a temperature threshold above the melting threshold of the thermoplastic resin, the first heating being carried out before the second heating and the second heating being carried out just before the introduction of the thermoplastic resin film into the stamping system.

7. The method according to claim 1, further comprising, after passage in the stamping system, an emission of air jets from channels disposed in the bottom of the cavities of the female cylinder of the stamping system to help the unmolding of the stamped film.

8. The method according to claim 1, further comprising cleaning the teeth of the male cylinder and of the cavities of the female cylinder of the stamping system using a cleaning system mounted on each of the cylinders and configured to remove any residue on the teeth or the cavities before they are put back into contact with the film.

9. The method according to claim 1, comprising controlling the temperature of the cylinders of the stamping system at a temperature lower than the crystallization temperature or at the glass transition temperature of the thermoplastic resin.

10. The method according claim 1, further comprising upstream of the passage in the stamping system, a passage of the thermoplastic resin film in a preparation system comprising two identical press cylinders with cavities facing each other during the operation of the preparation system and making it possible to compress the film on each place of the press cylinders free of cavities and to move material at the level of the areas of the film located facing the cavities of the press cylinders.

* * * * *